UNITED STATES PATENT OFFICE.

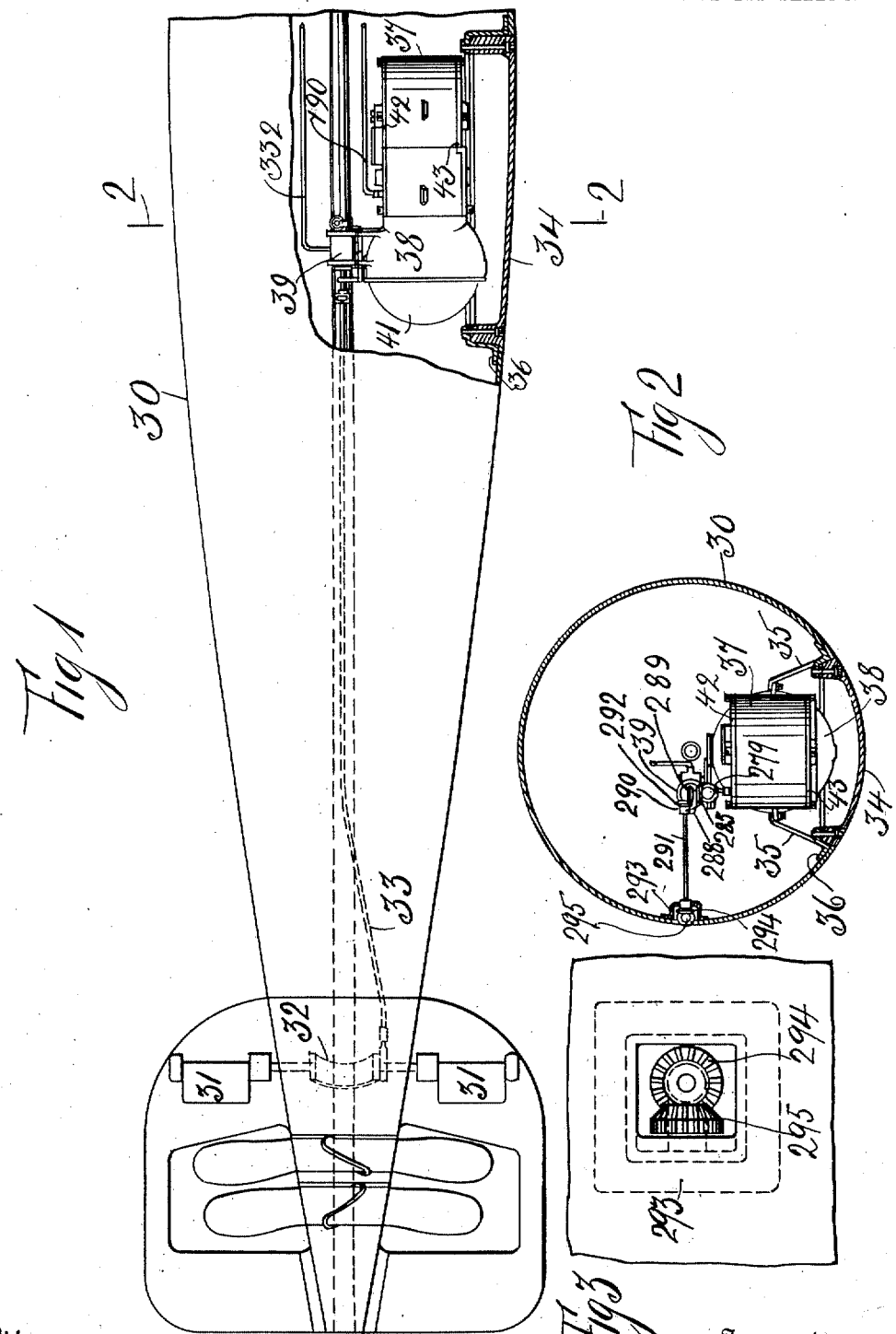

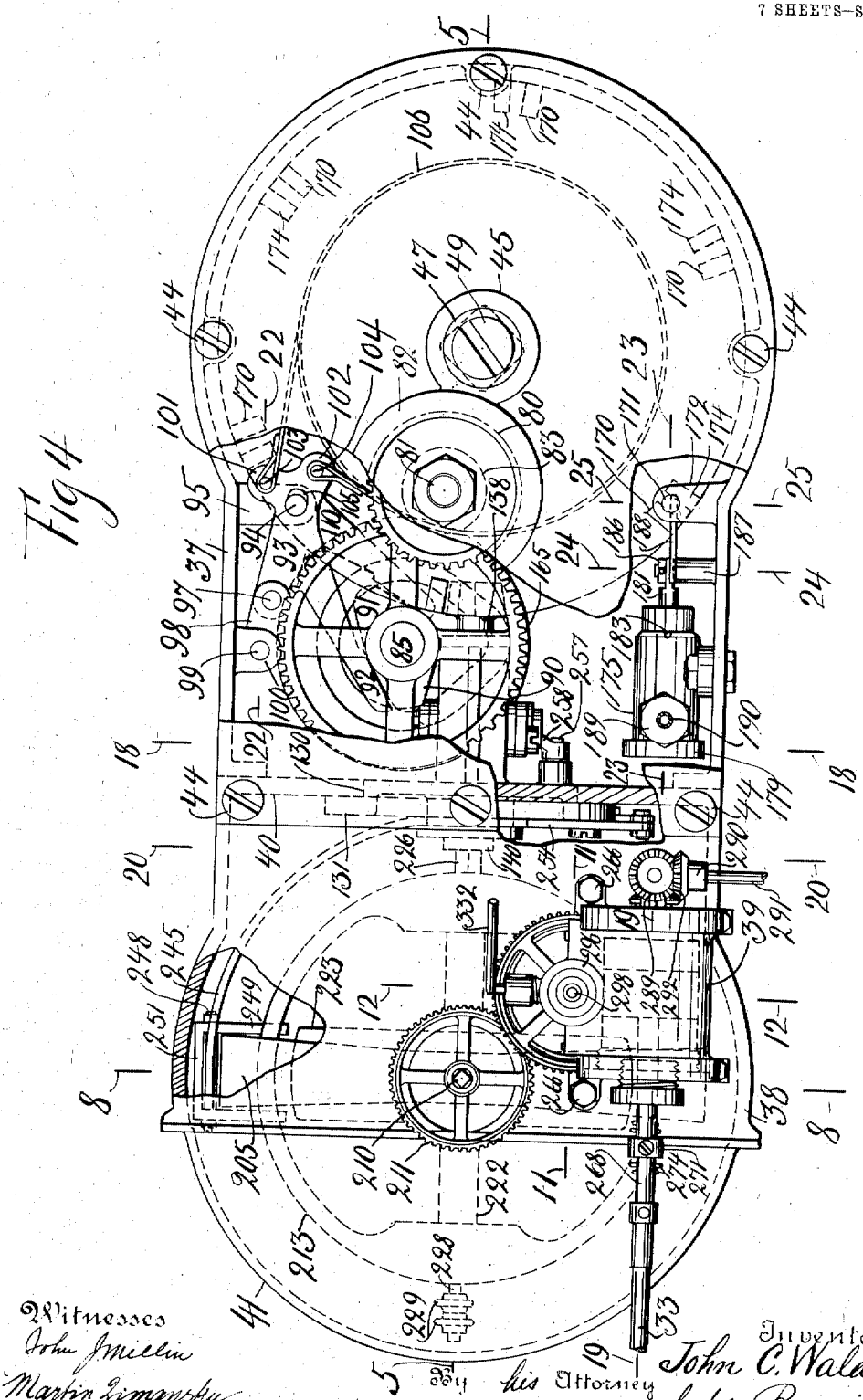

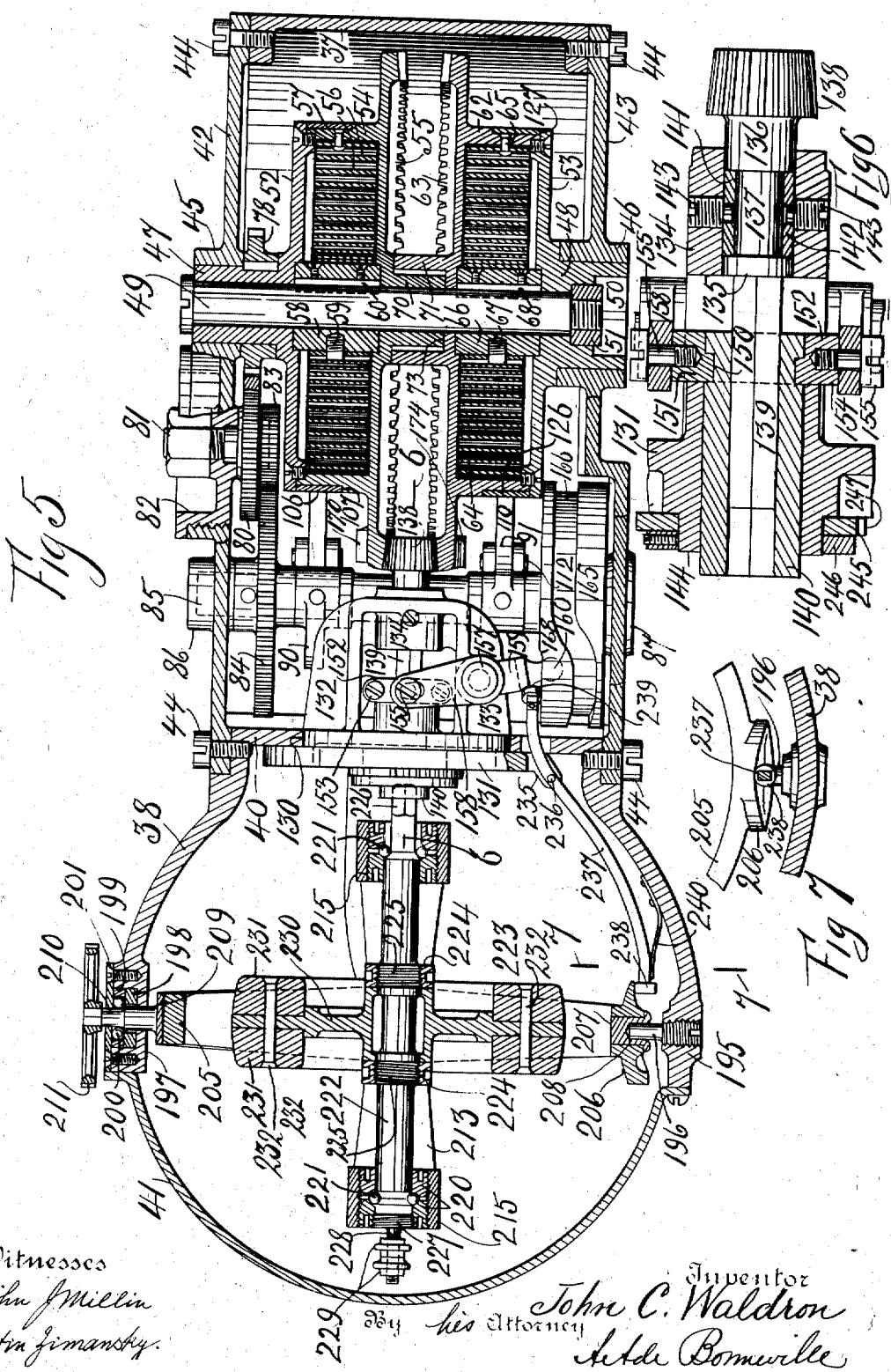

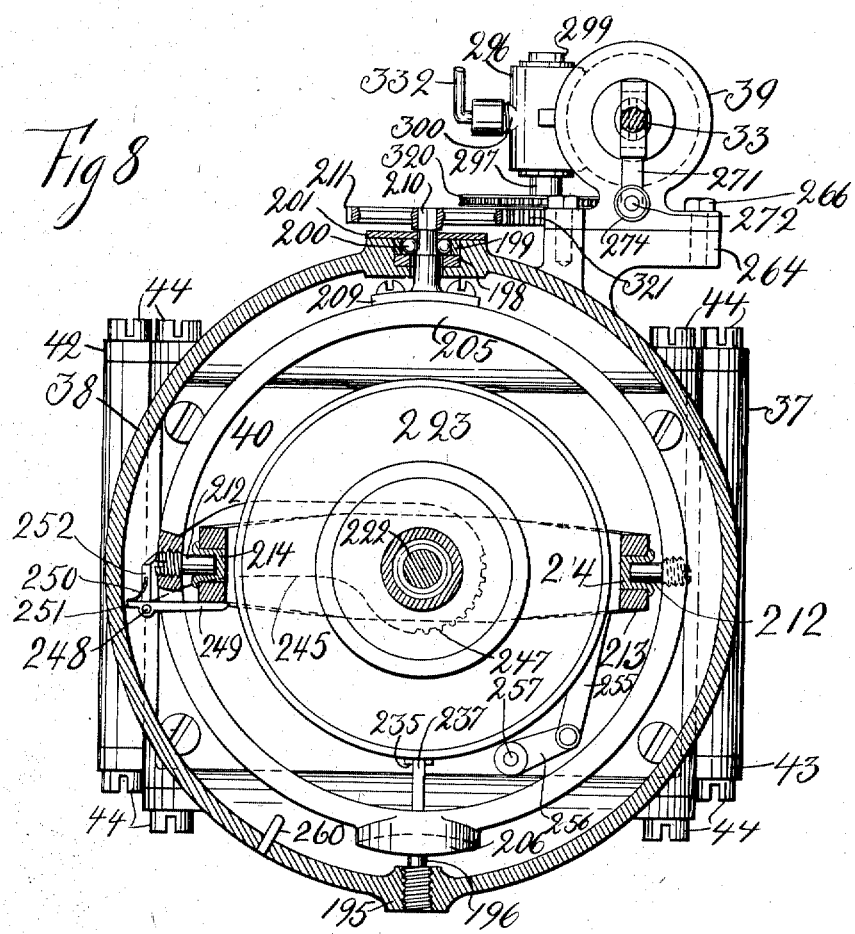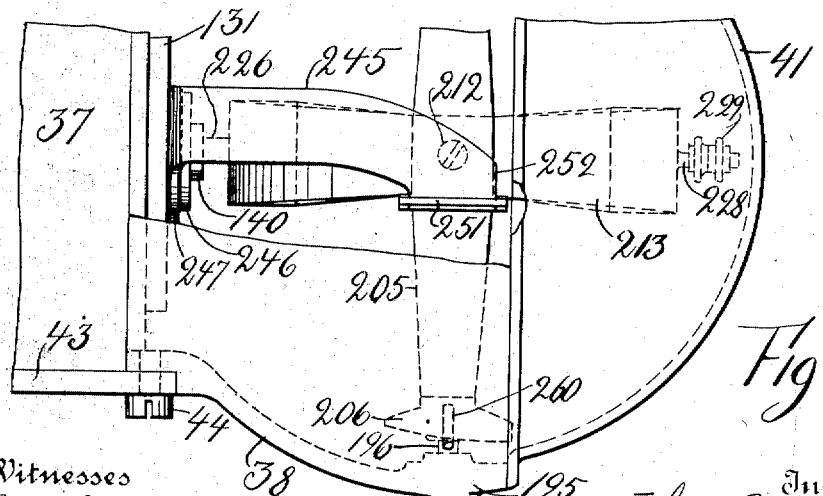

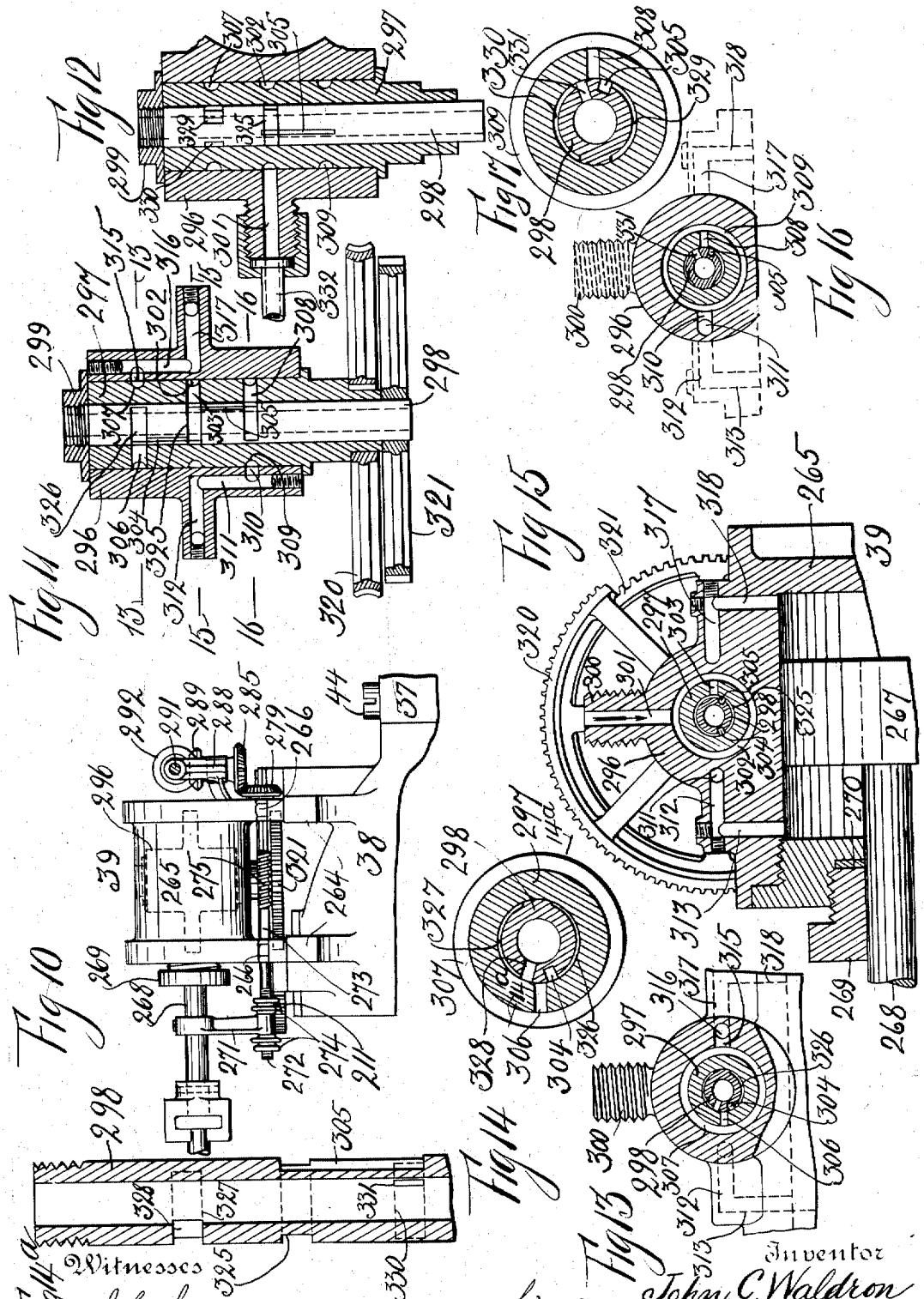

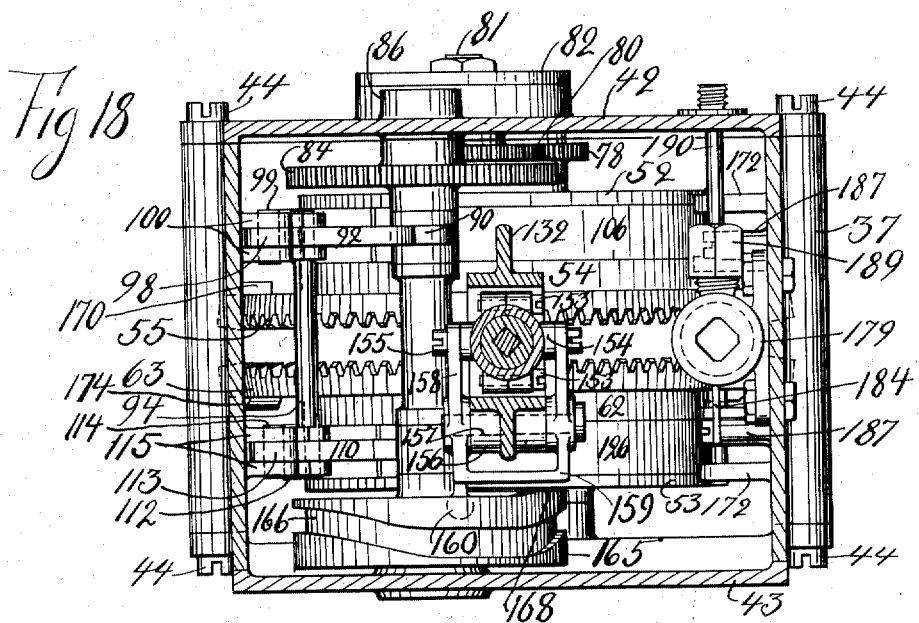
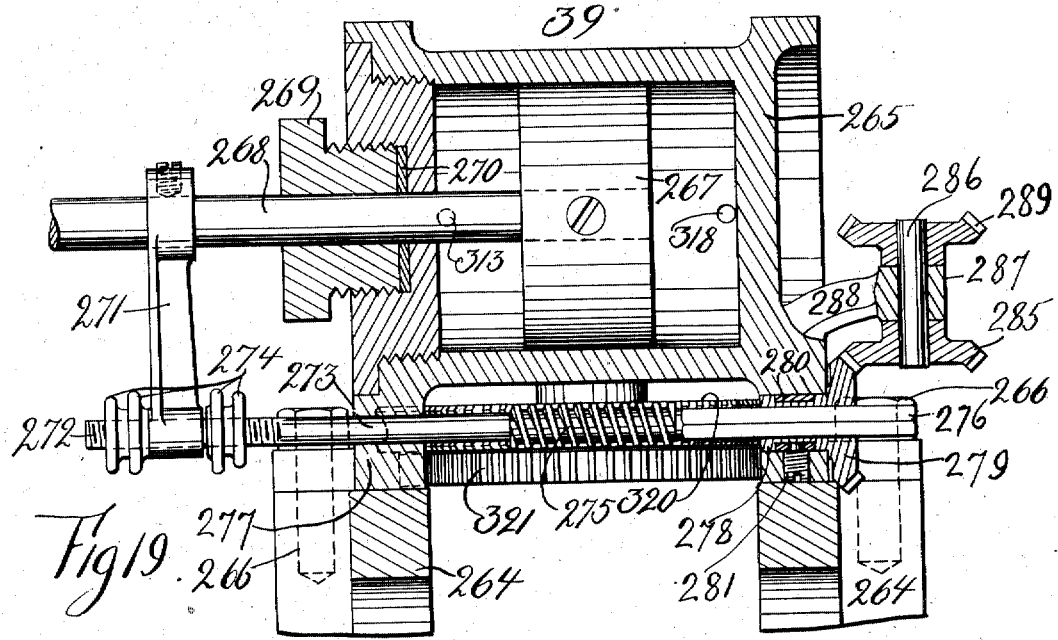

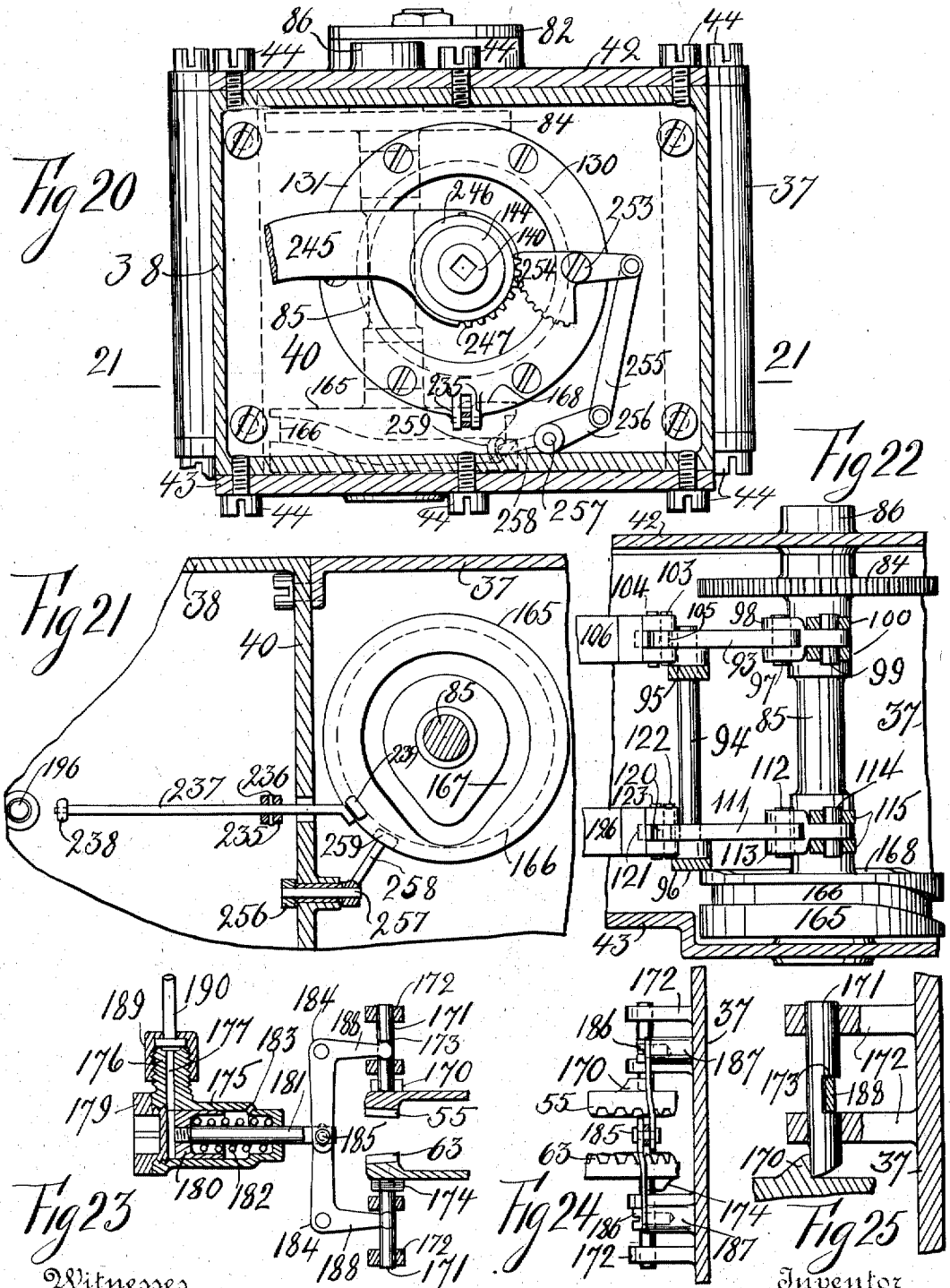

JOHN C. WALDRON, OF BROOKLYN, NEW YORK.

GYROSCOPIC STEERING APPARATUS.

983,467.

Specification of Letters Patent.     Patented Feb. 7, 1911.

Application filed March 6, 1908. Serial No. 419,553.

*To all whom it may concern:*

Be it known that I, JOHN C. WALDRON, a citizen of the United States, and a resident of the borough of Brooklyn, in the county of Kings and State of New York, have invented certain new and useful Improvements in Gyroscopic Steering Apparatus, of which the following is a specification.

This invention relates to gyroscopic steering apparatus for vessels, torpedoes and the like.

The invention is shown with a spring motor, although other means can be used to operate the gyroscope.

The spring motor described in this application will be claimed in a separate application.

The invention comprises means for propelling an object like a torpedo with a wide angle fire, by virtue of which the torpedo can be started in a direction inclined to the ultimate direction it is to take, making a curve after leaving the firing tube and then traveling in a straight line to the target.

With this invention the well known principle of the constancy of direction of a rotating body supported in gimbal rings as exemplified in the gyroscope is practically applied. The gyroscope comprises a rotative fly wheel supported in a gimbal ring, which is fulcrumed in an outer gimbal ring at right angles thereto, and the latter ring is fulcrumed to the torpedo or vessel, so that the latter can move out of the line of the axis of the fly wheel while the said fly wheel by reason of its inertia maintains a constant plane of rotation. There is consequently obtained a movement between the torpedo and the fly wheel, which movement is used to control the rudder of the torpedo. The invention contains a novel cam device for properly locating the outer gimbal ring in proper operative position.

To spin the gyroscope a double spring motor is shown, and to which are attached a pair of bevel gears actuated in opposite directions. The bevel gears communicate their rotations to a bevel pinion which drives a clutch for the gyroscope. The bevel gears acting at diametrically opposite points of the said pinion equalize the strains thereon, and consequently the strains on the shaft for the clutch that connects the gyroscope with said motor.

The appurtenances for the wide angle fire comprises a fluid actuated steering engine, the piston rod of which controls the position of the rudder tiller.

The engine is fitted with a valve chamber having an outer cylindrical valve and an inner tubular valve in the latter. The inner tubular valve can be oscillated by the flywheel of the gyroscope. The outer cylindrical valve has means to rotate it relatively to the tubular valve, so that the ports of the outer valve will allow a fluid to enter the engine and force the piston to one end of its stroke and maintain it in that position. The outer valve is moved in one direction to drive and locate the piston at one end of its stroke, and the said valve is moved in an opposite direction to drive and locate the piston at the opposite end of its stroke. These opposite positions of the piston will bring and locate the rudder of the torpedo to either port or starboard and maintain the rudder in such position until the vessel or torpedo makes its angle of divergence, at which instant the inner tubular valve is actuated to coact with the said outer valve, and the piston of the steering engine is brought to a central position, and holds the rudder centrally to carry the torpedo or vessel in a straight direction.

Figure 1 represents the stern end of a torpedo with the invention therewith, Fig. 2 shows a partial section of Fig. 1 on the line 2, 2, Fig. 3 is a partial enlarged side view of Fig. 2, Fig. 4 is a fragmentary top plan view of the main portion of the invention, Fig. 5 is a partial section of Fig. 4 on the line 5, 5, Fig. 6 shows an enlarged section of Fig. 5 on the line 6, 6, Fig. 7 represents an enlarged section of Fig. 5 on the line 7, 7, Fig. 8 is a section of Fig. 4 on the line 8, 8, Fig. 9 represents a lefthand side view of Fig. 8 with the cap of the casing broken away, Fig. 10 shows a partial front view of Fig. 4, Fig. 11 is a partial enlarged section of Fig. 4 on the line 11, 11, Fig. 12 is a partial enlarged section of Fig. 4 on the line 12, 12, Fig. 13 shows a partial section of Fig. 11 on the line 13, 13, Fig. 14 represents an enlarged portion of Fig. 13, Fig. 14$^a$ shows a partial enlarged section of Fig. 14 on the line 14$^a$, 14$^a$, Fig. 15 is a partial section of Fig. 11 as on the line 15, 15, Fig. 16 is a partial section of Fig. 11 on the line 16, 16, Fig. 17 shows an enlarged portion of Fig. 16, Fig. 18 represents a section of Fig. 4 on the line 18, 18, Fig. 19 shows an enlarged section of Fig. 4 on the line 19, 19, Fig. 20 is a section of Fig. 4 on the line 20, 20, Fig. 21 represents a section taken as on the line 21, 21 of Fig 20, Fig. 22 shows a section of Fig. 4 on the line 22, 22, Fig. 23 represents a section of Fig. 4 on the line 23, 23, Fig. 24 is a partial section of Fig. 4 on the line 24, 24 and Fig. 25 shows a partial enlarged section of Fig. 4 on the line 25, 25.

The invention is shown with the rear portion of a torpedo 30, rudder 31, tiller 32, tiller rod 33 which is an extension of the piston rod of the steering engine to be described. A bonnet 34 is bolted in position with hull of the torpedo, and brackets 35 extend from a flange 36 to support the casing 37 of the spring motor. The casing 37 is connected to an approximately spherical gyroscopic casing 38, which latter supports a steering engine 39, and has a flat front end 40 and a cap 41. The casing 37 is fitted with the top bonnet 42 and bottom bonnet 43, the said bonnets being bolted to the casing 37 by the bolts 44. A vertical bearing 45 is formed in the bonnet 42 and a bearing 46 axially in line therewith is formed in the bonnet 43. A hollow journal bearing 47 is supported in the bearing 45, and a hollow journal 48 is supported in the bearing 46. One end of a shaft 49, is carried in the bearing 47, while the other end of said shaft is supported in the bearing 48, which has the recess 50. A nut 51 on the shaft 49 extends into said recess and prevents the longitudinal displacement of the shaft 49. With the bearing 47 is formed the disk 52, and with the bearing 48 is formed the disk 53. To the disk 52 is fastened the spring box 54, which latter has formed therewith the bevel gear 55. The spring box 54 carries the spiral spring 56 and which is fastened thereto by means of the rivet 57. The other end of the spring 56 is fastened to the collar 58 by means of the screw 59, said collar being keyed to shaft 49 by the key 60. To the disk 53 is fastened the spring box 62 which has formed therewith the bevel gear 63. The spring box 62 carries the spiral spring 64, and the latter is fastened to its box by means of the rivet 65. The other end of the spring 64 is fastened to the collar 66 by means of the screw 67, said collar being keyed to the shaft 49 by the key 68. A sleeve 70 encircling the shaft 49 extends from the spring box 54 and enters a sleeve 71 extending from the spring box 62, the lower end of the first of said sleeves bearing against a shoulder 73 formed with the sleeve 71. The springs 56 and 64 are coiled in opposite directions. A pinion 78 encircles and is keyed to bearing 47, and meshes with a spur gear 80 journaled on a pin 81 fastened to the screw plug 82 supported in the bonnet 42. A pinion 83 extends from the spur gear 80 and meshes with the spur gear 84 fastened to the shaft 85 that is supported in bearing 86 formed with the bonnet 42, and the bearing 87 formed with the bonnet 43.

On the shaft 85 are fastened the cams 90 and 91. The cam 90 is located in the path of the arm 92 of the brake lever 93. The said brake lever 93 is supported by means of the oblong opening 105 on the pin 94, the upper end of which is carried on the bracket 95 extending from the casing 37, and the lower end of the pin 94 is fastened to a similar bracket 96 vertically below the same. The lefthand end of the brake lever 93 is pinned by the pin 97 to the forked shaped link 98 which latter is also pinned to the pin 99 secured in the lugs 100 extending from the casing 37. On the right hand end of the brake lever 93 are formed lugs 101 and 102, which carry the pins 103 and 104 that support the ends of the brake strap 106 that is carried in the shouldered portion 107 of the spring box 54. The cam 91 on the lower portion of the shaft 85 is in the path of the arm 110 of the brake lever 111 similar to 93. The brake lever 111 is carried on the lower end of the pin 94. The lefthand end of the brake lever 111 is pinned by means of the pin 112 to the forked shaped link 113, which latter is also pinned to the pin 114 of the lugs 115 extending from the casing 37. On the right hand end of the brake lever 111 are formed lugs 120, 121 which carry the pins 122, 123 that support the ends of the brake strap 126 carried in the shouldered portion 127 of the spring box 62.

An opening 130 is formed in the flat end 40 of the spherical casing 38 and carries coupling bracket 131 having the boss 144 and the arms 132, 133 extending through said opening. A journal bearing 134 is formed with said arms and supports the collars 135, 136 of the shaft 137. With the collar 136 is formed the bevel pinion 138 the teeth of which mesh with the teeth of both of the bevel gears 55 and 63. From the collar 135 extends the square shaft 139 that is slidably supported in the bushing 140. In the bearing 134 are supported the split linings 141, 142 by means of the screws 143, and which prevent any longitudinal displacement of the shaft 137. The bushing 140 is slidably carried in a cylindrical opening of the bracket 131. In a shouldered groove 150 of the bushing 140 are located the members 151, 152 of a split ring which are bolted together by means of the screws 153. The said members 151, 151 have the bosses 154 in which are located the screw pins 155. In the arm 133 of the bracket 131 is formed a boss 156 that secures a pin 157 on which are fulcrumed the arms 158 of a bracket 159, and the upper end of each arm 158 is connected to one of the screw pins 155, the openings in the arms 158 being elongated. The lower end of the bracket 159 terminates in the spherical head 160.

On the shaft 85 is fastened the double grooved cam drum 165 having the circumferential groove 166, the heart-shaped groove 167 and the top cam 168. The spherical head 160 engages with the heart-shaped groove 167.

From the back faces of the bevel gears 55, 63 extend stops 170 and 174 that can engage with the latch bolts 171 having the notches 173 and guided in the brackets 172 extending from the casing 37. To the said casing 37 is also bolted the locking cylinder 175 having the inlet plug 176 with conduit 177, the bonnet 179, piston 180 with piston rod 181, and spring 182 bearing between the said piston and the outer end of the cylinder. In the said cylinder is formed an opening 183. The piston rod 181 is flattened at its outer end and pinned to both of the bell cranks 184 by means of the pin 185. Each of the bell cranks 184 are fulcrumed on the screw pins 186 extending from the lugs 187, which latter project from the casing 37. The arms 188 of the bell cranks 184 engage with the notches 173 in the latch bolts 171. A screw cap 189 on the inlet plug 176 clamps the piping 190 for conducting air or other fluid pressure into the cylinder 175, thereby moving the piston 180 and bell cranks 184, by means of which the latch bolts 171 are disengaged from the stops 170.

The gyroscope casing 38 is thickened at its lower portion 195, where it has a threaded opening for the pivot 196. In the upper portion of said casing 38 is formed a roller bearing box 197, in which is located the ball bearing supporting plate 198 and ring 199 for the ball bearings 200. A cap 201 is fastened to the box 197 to hold the elements therein in place. An outer gimbal ring 205 is located in the casing 38 and has formed with its lower portion an adjusting cam 206. A pivot support 207 having a radial axial opening 208 is located centrally within said cam and engages with the pivot 196. From the upper end of the gimbal ring 205 extends the pivot bracket 209, with the pivot 210 that engages the roller bearings 200 in the box 197. The pivot 210 carries the spur gear 211. The gimbal ring 205 has extending from its sides and in a plane at right angles to the axial line of the pivots 196 and 210, the pivots 212 for the inner gimbal ring 213. The ring 213 carries axially in line the bearing supports 214 for the pivots 212. The inner gimbal ring 213 has formed therewith threaded bosses 215, which are in the same plane as the pivots 212 but at right angles thereto. Ball bearing supports comprising the members 220 are engaged with the threaded bosses 215, and carry the ball bearings 221. A shaft 222 is supported in the roller bearings 220 and carries the flywheel 223, which latter is kept in place on its shaft by means of the lock rings 224 engaging the threaded portions 225 of the shaft 222. The fly wheel 223 is composed of the spider 230 and the rings 231 which are clamped to said spider by means of the rivets 232 to form the rim. One end of the shaft 222 has extending therefrom the square end 226 that can engage with the bushing 140. One of the bearings 220 is threaded for the plug 227 which carries a threaded spindle 228 having the counterweights 229.

From the coupling bracket 131 extend the lugs 235 in which is fulcrumed on the pin 236, the gyroscope adjusting lever 237, which latter has journaled at its ends the rollers 238, 239. The roller 238 is located to engage with the cam 206, and the roller 239 engages with the top cam 168. A spring 240 extends from the casing 38 and bears up against the lever 237.

On the boss 144 of the bracket 131 is fulcrumed the locking lever 245, which is held in place by the collar 246 fastened to the boss 144. The lever 245 has formed therewith the teeth 247 at its fulcrumed end and the other end thereof has pinned thereto on the pin 248 the arms 249, and a spring 250 bears between the toe 251 of the arms 249 and the end 252 of the locking lever 245. From the bracket 131 extends the screw pin 253 on which is fulcrumed the toothed sector 254. A link 255 is pinned to the sector 254 at its upper end and to its lower end is pinned the arm 256 that is fastened to a pin 257, the latter being fulcrumed in a bearing extending from the flat end 40 of the casing 38. To the pin 257 is secured an arm 258 that carries the roller 259 which latter engages with the groove 166. A pin 260 extends from the casing 38 and is in the path of the toe 251.

Lugs 264 extend from the casing 38 to support the cylinder 265 of the steering engine 39, bolts 266 clamping the said cylinder in place. A piston 267 is located in the cylinder 265 and from it extends the piston rod 268, that passes through the gland 269 of the stuffing box with the packing 270. A bracket 271 extends from the piston rod 268 to the threaded end 272 of the worm shaft 273 and is held thereon by means of the jam nuts 274. A small amount of clearance is allowed between the bracket and jam nuts. The worm shaft has the worm 275, and the square portion 276 at one end. The cylindrical portion of the shaft 273 can slide and turn in the guide 277 of the cylinder, and the square portion 276 slides in the barrel 278 of the bevel gear 279. The said barrel 278 rotates in the split bearing 280, which latter is kept in place by means of the screw 281. A bevel gear 285 gears with the bevel gear 279 and is secured to the vertical spindle 286, which latter is supported in the boss 287 of the journal bracket 288 extending from the cylinder 265 and carries a bevel gear 289. A second boss 290 of the bracket 288 supports one end of a shaft 291 (see Fig. 2) having the bevel gear 292 fastened thereto, which latter meshes with bevel gear 289. The other end of the shaft 291 is journaled in a bracket 293 fastened to the shell 30 of the torpedo. On the shaft 291 is also fastened the bevel gear 294. A combined bevel and spur gear 295 is also journaled in the bracket 293, the beveled portion thereof gearing with the bevel gear 294, and the spur gear portion thereof gearing with a spur gear of the launching tube not shown.

A valve chamber 296 is formed with the cylinder 265 and contains the outer cylindrical valve 297 which contains the tubular valve 298. The upper portion of the valve 298 is threaded for the nut 299 that bears on the valve chamber 296. A threaded plug 300 contains the inlet port 301 that leads to the central circumferential port 302 formed with the outer valve 297, which latter is shown in its central position. From the circumferential port 302 extends the radial inlet port 303 that connects with the central circumferential port 325 of the inner tubular valve 298. From the latter extend respectively the upper and lower inlet ports 304, 305 on the outer surface of the tubular valve 298. The port 304 can engage with the upper radial port 306, that leads to an upper circumferential port 307 of the outer valve 297. The port 305 can engage with the lower radial port 308 which leads to the lower circumferential port 309 of the valve 297. The port 309 leads to the duct 310 that connects with the vertical port 311, and horizontal ports 312 and 313 formed in the valve chamber 296. The port 313 leads into one end of the cylinder 265. The upper circumferential port 307 in the outer valve 297 connects with the duct 315 in the valve chamber 296, and the said duct 315 connects with the vertical port 316 and the horizontal ports 317, 318 that connect with the other end of the cylinder 265. The tubular valve 298 also has formed on its outer surface the upper semi-annular inlet duct 326 which connects with the vertical inlet port 304, and the upper semi-annular outlet duct 327 which connects with the upper outlet port 328 in the valve 298. A lower semi-annular inlet duct 329 is also formed on the valve 298 which connects with the inlet duct 305. A lower semi-annular outlet duct 330 on the valve 298 connects with the lower outlet port 331 in valve 298. On the outer valve 297 is fastened a worm wheel 320, and to the inner tubular valve 298 is fastened the spur gear 321. The teeth of the worm wheel 320 mesh with the worm 275 of the worm shaft 273, and the teeth of the spur gear 321 mesh with teeth of the spur gear 211.

To operate the invention for a torpedo and before the latter leaves the launching tube (not shown) the outer valve 297 is set by means of an index on said tube which actuates the combined gear 295, and the latter through the shafts 291 and 286 with their gears turns the worm shaft 273. The latter turns the worm wheel 320 fastened to said outer valve 297, and brings it in proper position for the fluid to enter the cylinder 265 to force the piston to one end of its stroke, depending upon the direction in which the index has been turned. The springs are wound up by inserting a key into the socket 50 before putting the torpedo into the launching tube. When the springs are wound up the train of gears 78, 80, 83 and 84 rotate the shaft 85, causing the cams 90 and 91 on said shaft 85 to engage the arms 92 and 110 to thereby release the brake straps 106 and 126 of the spring boxes 54 and 62. The drum 165 is limited to one revolution, by reason of the gears 78, 83 and 84 producing a velocity ratio of two to one between the shaft 85 and the shaft 49, and when the spring motor is wound up the shaft 49 is turned two revolutions. The motor does not perform any work when the strap brakes 106 and 126 release the spring boxes 54 and 62. During the rotation of the cam drum 165, the lever 237 causes its roller 238 to bear up against the adjusting cam 206 of the outer gimbal ring 205, to bring it to a plane at right angles to the longitudinal axis of the torpedo, and the gear 211 meshing with the gear 321 on the valve 298 brings the latter in its central position. The said drum 165 also by means of the groove 166 guides the roller 259, so that through its linked connections it moves the sector 254. The latter actuates the locking lever 245, that causes the arms 249 to bear up against the bottom face of the inner gimbal ring 213, by virtue of which said ring is brought to a horizontal position. The axis of the fly wheel is thus brought in line with the axis of the torpedo, so that its square end 226 can be engaged by the square opening in the bushing 140 of the clutch. After the square end 226 has been properly located, the heart-shaped groove 167 in the drum 166 by means of the spherical head 160 moves the bracket 159, the arms 158 of which latter move the bushing 140 to engage with the square end 226 of the fly wheel shaft 222. Next the torpedo is shot from the launching tube and immediately a propeller engine therein (not shown) is started by the contact of a hook lever in the tube engaging with a starting lever in the torpedo (not shown) which opens valves in a pipe extending from an air reservoir, to said engine and to the branch pipes 190 and 332. The pipe 190 leads fluid pressure against the piston 180 in the locking cylinder 175 which is thereby forced out and causes the bell cranks 184 to raise the latch bolts 171, and disengage them from the stops on the bevel gears 55 and 63 thereby starting the gyroscope before the torpedo leaves the tube. The pipe 332 at the same time conducts fluid pressure to the valve chamber 296 through the port 301 and enters the central circumferential port 302. From the port 302 it enters the radial port 303 from which it is led to the central circumferential port 325 of the tubular valve 298. The fluid then enters the upper inlet port 304 and lower inlet port 305. From the port 304 the fluid enters the semi-annular inlet duct 326, and from the port 305 it enters the semi-annular inlet duct 329. As soon as the outer cylindrical valve 297 is turned from the central position in which it is shown, by means of the indexing appurtenances to its predetermined angle, then the semi-annular inlet duct 326 is brought in communication with the port 306, or the semi-annular duct 329 is brought in communication with port 308, and pressure is allowed to enter either end of the cylinder and forces the piston to either end thereof.

When the inlet duct 326 is brought in communication with the upper radial port 306, the outlet duct 330 is brought in communication with the radial port 308 and exhaust takes place from the cylinder by way of the ports 313, 312, 311 duct 310, ports 308, 309, 331 and into and through the axis of valve 298. When the inlet duct 329 communicates with the lower radial port 308 exhaust takes place from the cylinder by way of the ports 318, 317, 316, duct 315, port 307 306 and 328 and into and through the axis of the valve 298. When the torpedo has made its predetermined angle then the inner valve 298 is again brought to its central position, by reason of the angle between the axis of the flywheel of the gyroscope and the longitudinal axis of the torpedo. The radial port 306 is then opposite the bridge between the ports 304 and 328, and the port 308 is opposite the bridge between the ports 305 and 331 maintaining the piston 267 in a central position as soon as the latch bolts 171 are disengaged from the stops 170 and 174 of the spring boxes 54 and 62, the said boxes with their bevel gears 55 and 63 are rotated in opposite directions by reason of the recoil of the springs 56 and 64, which rotates the bevel pinions 138 and spins the fly wheel 223 of the gyroscope. At the same time the train of gears 78, 80, 83 and 84 are turned, which turns the shaft 85 with its drum 165 and cams 90 and 91. The arms 92 and 110, then cause the brake straps 106 and 126 to engage the spring boxes 52 and 64 to hold or stop them, which consequently stops the bevel gears 55 and 63. The turning of the drum 165 causes its top cam 168 to lift the roller 239 of the lever 237 to release the roller 238 from the face of the adjusting cam 206. The circumferential groove 166 of the drum 165 engaging the roller 259 of the arm 258 causes the sector 254 through its link connections 253, 255 and 256 to release the locking lever 245 from the inner gimbal ring 213. The heart shaped groove 167 of the drum 165 engaging the spherical head 160 of the bracket 159 causes the bushing 140 to become disengaged from the square end 226 of the shaft 222. Thus the gyroscope and the motor are completely disengaged.

When the piston is in its central position and if for any reason the torpedo deviates from its straight path the inner valve 298 is rotated in one direction or the other, by the action of the gyroscope to allow pressure to be brought against one side of the piston, which motion is transmitted to the rudders 31, and steers the torpedo to take its straight predetermined path. While the piston is thus moving its motion is transmitted through the bracket 271 to the worm 275, which latter acting as a rack against the worm wheel 320 actuates the outer valve, and turns to a new central position relatively to the inner valve, the ports between the two valves being thereby blocked against each other. The rudders are by this blocked position of the valves kept locked in their new angular position to port or starboard, until their action is felt by the torpedo and the latter answers the said new position of the rudders. At the same time the gyroscope maintaining its original direction causes the inner valve to turn to counteract the new direction given to the torpedo, and if this new direction moves the torpedo beyond its original straight direction, the gyroscope moves the inner valve which coacting with the outer valve, again allows pressure to enter the cylinder but in the opposite end thereof, to move the rudder in an opposite direction. These reverse actions of the pressure are kept up consecutively to steer the torpedo in a straight line. The clearance between the bracket 271 and the jam nuts 274 allows the piston and consequently the rudders to move a little before actuating the outer valve.

Having described my invention I claim:

1. The combination in a gyroscopic steering apparatus of a spring motor, a shaft driven by said motor, a cam drum on the shaft, an outer gimbal ring fulcrumed in the apparatus, an inner gimbal ring fulcrumed in the said outer ring, a fly wheel journaled in the inner ring, an adjusting cam formed with the outer gimbal ring, a lever fulcrumed in the apparatus, a roller on each end of said lever, one of said rollers engaging the cam drum and the other roller located to engage the said adjusting cam.

2. The combination in a gyroscopic steering apparatus of a casing, an outer gimbal ring fulcrumed in said casing, an inner gimbal ring fulcrumed in the said outer ring, a fly wheel journaled in the inner ring, a steering engine connected to the casing, a valve chamber for the steering engine, an outer rotative cylindrical valve in the valve chamber of the engine, an inner tubular valve in the outer valve, connections between the said outer gimbal ring and the said inner tubular valve and means to turn and locate the outer valve in operative position.

3. The combination with a gyroscopic apparatus of a steering gear, a steering engine, a pair of coacting valves for the engine, means to set one of said valves to steer a vessel in a predetermined arc, and connections between the other valve and the gyroscopic apparatus to steer the vessel in a straight path.

4. The combination with a gyroscopic apparatus of a steering gear and engine, an inner tubular valve for said engine, an outer valve encircling said tubular valve, means to set said outer valve, and connections between the gyroscopic apparatus and the inner valve.

5. The combination with a gyroscopic apparatus for a vessel of a steering gear, a steering engine for the apparatus, an inner tubular valve for the engine, an outer valve encircling said tubular valve, a combination of elements extending from the outer valve to outside of the shell of the vessel to set the outer valve, and gearing connecting the gyroscopic apparatus with the said inner tubular valve.

6. The combination with a gyroscopic apparatus for a vessel of a steering gear, a steering engine in the vessel, a cylinder for said engine, a piston in the engine, a valve chamber for the cylinder, an inner tubular valve in said chamber, an outer valve encircling said tubular valve, coacting ports in the valves, a gear connected to the gyroscope, a gear connected to the tubular valve, the teeth of said gears meshing with each other, a gear connected to the outer valve, and connections extending from the latter gear to the outside of the said vessel to set the outer valve in a predetermined position.

7. The combination with a gyroscopic apparatus for a vessel of a steering gear, a steering engine in the vessel, a cylinder for said engine, a piston in the engine, a valve chamber for the cylinder, an inner tubular valve in said chamber, an outer valve encircling said tubular valve, coacting ports in the valves, a gear connected to the gyroscope, a gear connected to the tubular valve, the teeth of said gears meshing with each other, a gear connected to the outer valve, connections extending from the latter gear to the outside of the said vessel to set the outer valve in a predetermined position, and a connection between said outer valve and the piston of the engine.

8. The combination with a steering engine of a cylinder, a piston therein, a valve chamber for the cylinder, a cylindrical outer valve in said chamber, a tubular valve in said outer valve, a central circumferential port formed on the outer cylindrical surface of the outer valve, an inlet port in the valve chamber connecting with said circumferential port, a radial inlet port in the outer valve connecting with its circumferential port, a central circumferential port on the outer surface of the tubular valve connecting with the radial inlet port of the outer valve, upper and lower inlet ports on the outer surface of the tubular valve connecting with the central circumferential port of said tubular valve, a radial inlet port through the outer valve connecting with the upper inlet port of the tubular valve, and the latter radial port leading to an upper circumferential port of the outer valve, a lower radial port through the outer valve connecting with the lower inlet port of the tubular valve and a lower circumferential port on the outer valve connecting with the latter radial port, ports in the valve chamber leading to one end of the cylinder connecting with the upper circumferential port of the outer valve, ports in the valve chamber of the cylinder connecting with the other end of the cylinder and the said lower circumferential port of the outer valve, an upper semi-annular inlet duct on the tubular valve connecting with the upper port thereon, an upper semi-annular outlet duct on the tubular valve and an outlet port extending from the latter to the axis of the tubular valve, a lower semi-annular inlet duct on the outer tubular valve connecting with the lower inlet port thereon, a lower semi-annular outlet duct on the tubular valve and a lower outlet port on the tubular valve extending from the latter duct to the axis thereof.

9. The combination in a gyroscopic steering apparatus of an engine, a cylinder for said engine, a piston in the cylinder, a piston rod for the piston, a valve chamber for the cylinder, an outer cylindrical valve in the said valve chamber, ports in said valve, a tubular valve in the outer valve, ports in the tubular valve coacting with the ports of the outer valve, a spur gear on the tubular valve, a gyroscope, an outer gimbal ring for the gyroscope, a spur gear connected with said outer gimbal ring, the teeth of the latter spur gear meshing with the teeth of the spur gear connected with the tubular valve, a worm wheel on the said outer cylindrical valve, a worm shaft slidably and rotatably supported with said cylinder, a worm on the worm shaft meshing with said worm wheel, a bracket extending between the worm shaft and the piston rod of the engine, and means to rotate the worm shaft.

10. The combination in a gyroscopic steering apparatus of an engine, a cylinder for said engine, a piston in the cylinder, a piston rod for the piston, a valve chamber for the cylinder, an outer cylindrical valve in the said valve chamber, ports in said valve, a tubular valve in the outer valve, ports in the tubular valve coacting with the ports of the outer valve, a spur gear on the tubular valve, a gyroscope, an outer gimbal ring for the gyroscope, a spur gear connected with said outer gimbal ring, the teeth of the latter spur gear meshing with the teeth of the spur gear connected with the tubular valve, a worm wheel on the said outer cylindrical valve, a bevel gear journaled with the cylinder, a square opening in the hub of said bevel gear, a worm shaft parallel to the piston rod of the cylinder supported at one end in a cylindrical guide therein, a squared portion at the other end of the cylinder guided in the square opening in the hub of said bevel gear, a worm on the worm shaft meshing with said worm wheel, a bracket extending between the worm shaft and the piston rod of the engine, and means to rotate said bevel gear.

Signed at the borough of Manhattan in the county of New York and State of New York this 29th day of February A. D. 1908.

JOHN C. WALDRON.

Witnesses:
M. HETHER,
MARTIN ZIMANSKY.